United States Patent
Grubb

(10) Patent No.: US 10,431,197 B2
(45) Date of Patent: Oct. 1, 2019

(54) ACTIVE CANCELLATION OF A PULSATING FLOW WITH A SOURCE NOISE REFERENCE

(71) Applicant: Norgren Limited, Lichfield, Staffordshire (GB)

(72) Inventor: Mark Richard Grubb, Lichfield (GB)

(73) Assignee: NORGREN LIMITED (GB)

( * ) Notice: Subject to any disclaimer, the term of this patent is extended or adjusted under 35 U.S.C. 154(b) by 93 days.

(21) Appl. No.: 15/738,272

(22) PCT Filed: Jul. 4, 2016

(86) PCT No.: PCT/GB2016/052018
§ 371 (c)(1),
(2) Date: Dec. 20, 2017

(87) PCT Pub. No.: WO2017/006101
PCT Pub. Date: Jan. 12, 2017

(65) Prior Publication Data
US 2018/0166060 A1    Jun. 14, 2018

(30) Foreign Application Priority Data
Jul. 8, 2015    (GB) .................................. 1511982.9

(51) Int. Cl.
*G10K 11/178*    (2006.01)
*F04C 14/24*    (2006.01)
(Continued)

(52) U.S. Cl.
CPC ............ *G10K 11/178* (2013.01); *F04C 14/24* (2013.01); *F04C 14/28* (2013.01); *F04C 29/06* (2013.01);
(Continued)

(58) Field of Classification Search
CPC ............... G10K 11/178; G10K 11/161; G10K 2210/109; G10K 2210/121;
(Continued)

(56) References Cited

U.S. PATENT DOCUMENTS 5,571,239 A * 11/1996 Kameda .................. F01N 1/065
                                                            123/184.21
5,628,499 A    5/1997 Ikeda et al.
(Continued)

FOREIGN PATENT DOCUMENTS

| DE | 102011105027 | 12/2011 |
|---|---|---|
| EP | 2116752 | 11/2009 |
| WO | 9109214 | 6/1991 |

OTHER PUBLICATIONS

Corresponding International Search Report and Written Opinion for PCT/GB2016/052018 dated Oct. 7, 2016. WO.

*Primary Examiner* — Jason R Kurr
(74) *Attorney, Agent, or Firm* — The Belles Group, P.C.

(57) ABSTRACT

An electronics for active cancellation of a pulsating flow with a source noise reference. The electronics includes a signal processor configured to receive a noise source signal and a flow signal. The signal processor is also configured to generate a cancelling signal based on the noise source signal and the flow signal. A controller is communicatively coupled to the signal processor, and configured to determine a flow rate control signal for controlling the flow rate of the pulsating flow. A signal generator coupled to the signal processor and the controller is configured to receive the flow rate control signal, generate a valve signal based on the flow rate control signal and the cancelling signal, and provide the valve signal to a valve to control the flow rate and attenuate the one or more pulses of the pulsating flow.

15 Claims, 5 Drawing Sheets

(51) Int. Cl.
*G05D 7/06* (2006.01)
*G10K 11/16* (2006.01)
*F04C 29/06* (2006.01)
*F04C 14/28* (2006.01)
*F16L 55/033* (2006.01)

(52) U.S. Cl.
CPC ......... *G05D 7/0635* (2013.01); *G10K 11/161* (2013.01); *F04C 2270/135* (2013.01); *F04C 2270/145* (2013.01); *F04C 2270/80* (2013.01); *F04C 2270/86* (2013.01); *F16L 55/0333* (2013.01); *G10K 2210/109* (2013.01); *G10K 2210/121* (2013.01)

(58) Field of Classification Search
CPC .. G10K 2210/112; F16L 55/02; F16L 55/033; F16L 55/0333; F16L 55/04; F16L 55/055; F04C 14/24; F04C 14/28; F04C 29/06; F04C 2270/135; F04C 2270/145; F04C 2270/80; F04C 2270/86; G05D 7/0635
See application file for complete search history.

(56) References Cited

U.S. PATENT DOCUMENTS

| | | | |
|---|---|---|---|
| 5,850,458 A | 12/1998 | Tomisawa et al. | |
| 7,693,606 B2* | 4/2010 | Ahmad | G01F 1/6847 700/28 |
| 2011/0015791 A1* | 1/2011 | Smirnov | G01F 1/696 700/282 |
| 2012/0020807 A1 | 1/2012 | Fernholz et al. | |
| 2014/0374634 A1* | 12/2014 | Ohtsuki | G05D 7/0635 251/129.06 |

* cited by examiner

ACTIVE CANCELLATION OF A PULSATING FLOW WITH A SOURCE NOISE REFERENCE

CROSS-REFERENCE TO RELATED APPLICATIONS

This application is a U.S. national stage application under 35 U.S.C. § 371 of PCT Application No. PCT/GB2016/052018, filed Jul. 4, 2016, which claims priority to United Kingdom Patent Application No. GB1511982.9, filed Jul. 8, 2015, the entireties of which are incorporated herein by reference.

TECHNICAL FIELD

The embodiments described below relate to cancellation of a pulses in a pulsating flow and, more particularly, to active cancellation of a pulsating flow with a source noise reference.

BACKGROUND

Fluid can be obtained from different sources, one of which is a pump that receives a fluid from a fluid supply, displaces the fluid with a mechanical means, and provides the fluid to, for example, a conduit. The mechanical means employed by the pump may be a member with a reciprocal motion, such as pistons, peristaltic rotors, or the like. The reciprocal motion periodically displaces the fluid towards the conduit, thereby causing the fluid to flow. Due to the reciprocal motion, the fluid provided by the pump may have pulses that are carried downstream through the conduit. Accordingly, the pulses are sometimes referred to as fluid born noise ("FBN"). There are other noise sources of FBN such as, for example, nearby vibrating machinery, vibrations from the environment due to being in the moving vehicle, such as a rail car, or the like. Fluid flow with the FBN is commonly referred to as a pulsating flow.

The pumps are typically used in fluid control systems with a valve. The valve may be a proportional valve, although many other valves or flow controllers may be employed with the pumps. For example, a proportional valve downstream from the pump may control a flow rate of the fluid with a flow sensor. More specifically, the flow sensor may measure the flow rate of the fluid flowing through the conduit and provide a flow rate signal to the valve. The flow rate signal can be proportional to the measured flow rate of the fluid. Using the flow rate signal, the proportional valve may control the flow rate of the fluid through the conduit.

However, due to the FBN, the flow rate signal may also include noise. The noise can cause the flow controller to be unstable. For example, a position of the proportional valve may not correspond to a flow rate set point and, instead, may continuously oscillate about the set point. Accordingly, it is desirable to attenuate the pulses in the pulsating flow so the flow rate may be stable.

Some fluid control systems employ a signal from, for example, a pressure transducer to attenuate the pulses. More specifically, the pressure transducer may measure the pulses in the pulsating flow and provide a noise signal that corresponds to the pulses in the pulsating flow. The noise signal may be used to provide a noise reference employed to generate a signal that, when applied to the pulsating flow, cancels the pulses. In effect, the signal applied to the pulsating flow is a cancelling signal. The cancelling signal may be 180 degrees out of phase with the noise reference and, therefore, 180 degrees out of phase with the pulses. Accordingly, the fluid flow becomes more smooth, thereby providing a more stable fluid flow.

However, the pressure transducer may not have sufficient bandwidth to convert all of the pulses into the noise reference. For example, the pulses may have high frequency components that are greater than the cutoff frequency of the pressure transducer's passband. In addition, the pressure transducer is a separate device from the pump and other components in the fluid control system. As a result, the pressure transducer is an additional undesirable hardware cost.

Since the noise source (e.g., pump, vibrating machinery, moving vehicle, etc.) is the source of the pulses in the pulsating flow, the noise source could provide the noise reference. In other words, the noise reference may be a source noise reference. As a result, the noise reference provided by the noise source may include all of the frequencies associated with the pulses in the pulsating flow. Other benefits may also be realized if the source could be employed as a noise reference. Accordingly, there is a need for active cancellation of pulsating flow with a source noise reference.

SUMMARY

An electronics for active cancellation of a pulsating flow with a source noise reference is provided. According to an embodiment, the electronics comprises a signal processor configured to receive a noise source signal from a noise source that causes one or more pulses of the pulsating flow and a flow signal from a flow sensor configured to measure a flow rate of the pulsating flow and generate a cancelling signal based on the noise source signal and the flow signal. The electronics also comprises a controller communicatively coupled to the signal processor, the controller being configured to generate a flow rate control signal for controlling the flow rate of the pulsating flow. The electronics also comprises a signal generator communicatively coupled to the signal processor and the controller. The signal generator is configured to receive the flow rate control signal, generate a valve signal based on the flow rate control signal and the cancelling signal, and provide the valve signal to a valve to control the flow rate and attenuate the one or more pulses of the pulsating flow.

A method for active cancellation of a pulsating flow with a source noise reference is provided. According to an embodiment, the method comprises receiving a noise source signal from a noise source that causes one or more pulses of the pulsating flow, receiving a flow signal from a flow sensor that measures a flow rate of the pulsating flow, and generating a flow rate control signal from the flow signal and a cancelling signal from the noise source signal. The method also comprises generating a valve signal from the flow rate control signal and the cancelling signal, and providing the valve signal to a valve to control the flow rate and attenuate the one or more pulses of the pulsating flow.

A system for active cancellation of a pulsating flow with a source noise reference is provided. According to an embodiment, the system comprises a flow control system comprising a valve and a flow sensor fluidly coupled to the valve. The system also comprises an electronics communicatively coupled to a noise source, the valve, and the flow sensor. The electronics is configured to receive a noise source signal from the noise reference and a flow signal from the flow sensor, generate a valve signal based on the flow rate control signal and the cancelling signal, and provide the valve signal to the valve to control the flow rate and attenuate one or more pulses of the pulsating flow.

Aspects

According to an aspect, an electronics (100) for active cancellation of a pulsating flow with a source noise reference comprises a signal processor (110) configured to receive a noise source signal (210a) from a noise source (210) that causes one or more pulses of the pulsating flow and a flow signal (230a) from a flow sensor (230) configured to measure a flow rate of the pulsating flow, and generate a cancelling signal (110a) based on the noise source signal (210a) and the flow signal (230a). The electronics (100) also comprises a controller (120) communicatively coupled to the signal processor (110), the controller (120) being configured to generate a flow rate control signal (120a) for controlling the flow rate of the pulsating flow, and a signal generator (130) communicatively coupled to the signal processor (110) and the controller (120). The signal generator (130) is configured to receive the flow rate control signal (120a), generate a valve signal (130a) based on the flow rate control signal (120a) and the cancelling signal (110a), and provide the valve signal (130a) to a valve (220) to control the flow rate and attenuate the one or more pulses of the pulsating flow.

Preferably, the signal processor (110) is further configured to receive a feedback error (e) from the flow signal (230a) and provide the cancelling signal (110a) based on the feedback error (e).

Preferably, the signal processor (110) is configured to adjust a phase and an amplitude of the noise source signal (210a) to provide the cancelling signal (110a).

Preferably, the signal processor (110) is configured to generate and provide coefficients to a filter (114) that receives the noise source signal (210a) and provides the cancelling signal (110a).

Preferably, the signal processor (110) is further configured to provide coefficients to the filter (114) to minimize the feedback error (e).

Preferably, the signal generator (130) is comprised of a pulse width modulation generator (132) and a valve drive (134).

According to an aspect, a method for active cancellation of a pulsating flow with a source noise reference comprises receiving a noise source signal from a pump that causes one or more pulses of the pulsating flow, receiving a flow signal from a flow sensor that measures a flow rate of the pulsating flow, generating a flow rate control signal from the flow signal and a cancelling signal from the noise source signal, generating a valve signal from the flow rate control signal and the cancelling signal, and providing the valve signal to a valve to control the flow rate and attenuate the one or more pulses of the pulsating flow.

Preferably, the method further comprises receiving a feedback error from the flow signal and providing the cancelling signal based on the feedback error.

Preferably, the method further comprises generating the cancelling signal from the noise source signal comprises adjusting a phase and an amplitude of the noise source signal.

Preferably, the method further comprises generating and providing coefficients to a filter that receives the noise source signal and provides the cancelling signal.

Preferably, generating the valve signal comprises generating a pulse width modulated signal and using the pulse width modulated signal to generate the valve signal.

According to an aspect, a system (10) for active cancellation of a pulsating flow with a source noise reference comprises a fluid control system (200) comprising a valve (220) and a flow sensor (230) fluidly coupled to the valve (220). The system (10) further comprises an electronics (100) communicatively coupled to a noise source (210), the valve (220), and the flow sensor (230), and configured to receive a noise source signal (210a) from the noise source (210) and a flow signal (230a) from the flow sensor (230), generate a valve signal (130a) based on the flow rate control signal (120a) and the cancelling signal (110a), and provide the valve signal (130a) to the valve (220) to control the flow rate and attenuate one or more pulses of the pulsating flow.

Preferably, the electronics (100) comprises a signal processor (110) configured to receive the noise source signal (210a) from the noise source (210) and the flow signal (230a) from the flow sensor (230) and provide a cancelling signal (110a) based on the noise source signal (210a) and the flow signal (230a).

Preferably, the electronics (100) further comprises a controller (120) configured to receive a difference between a set point SP and a flow signal (230a), generate a flow rate control signal (120a) based on the difference, and provide the flow rate control signal (120a) to the signal generator (130).

Preferably, the signal generator (130) is further configured to receive a summation of the cancelling signal (110a) and the flow rate control signal (120a).

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of active cancellation of a pulsating flow with a source noise reference. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the active cancellation of the pulsating flow with the source noise reference. As a result, the embodiments described below are not limited to the specific examples described below, but only by the claims and their equivalents.

The following specific examples illustrate system and methods for active cancellation of a pulsating flow with a source noise reference. Instead of a noise reference obtained from a pressure transducer, the noise reference is obtained from a noise source signal. The noise source signal may be based on noise provided by a noise source that may cause one or more pulses in the pulsating flow. However, the noise source also provides the noise reference used to attenuate the pulses, thereby reducing the number of components in a fluid control system by eliminating the need for the pressure transducer. In addition, the noise reference provided by the noise source signal may include components, such as high frequency components, that the pressure transducer may not be able to sense. Therefore, the active cancellation of the pulsating flow with the source noise reference may more effectively attenuate the pulses in the pulsating flow.

A System for Active Cancellation of a Pulsating Flow

Figure 1:
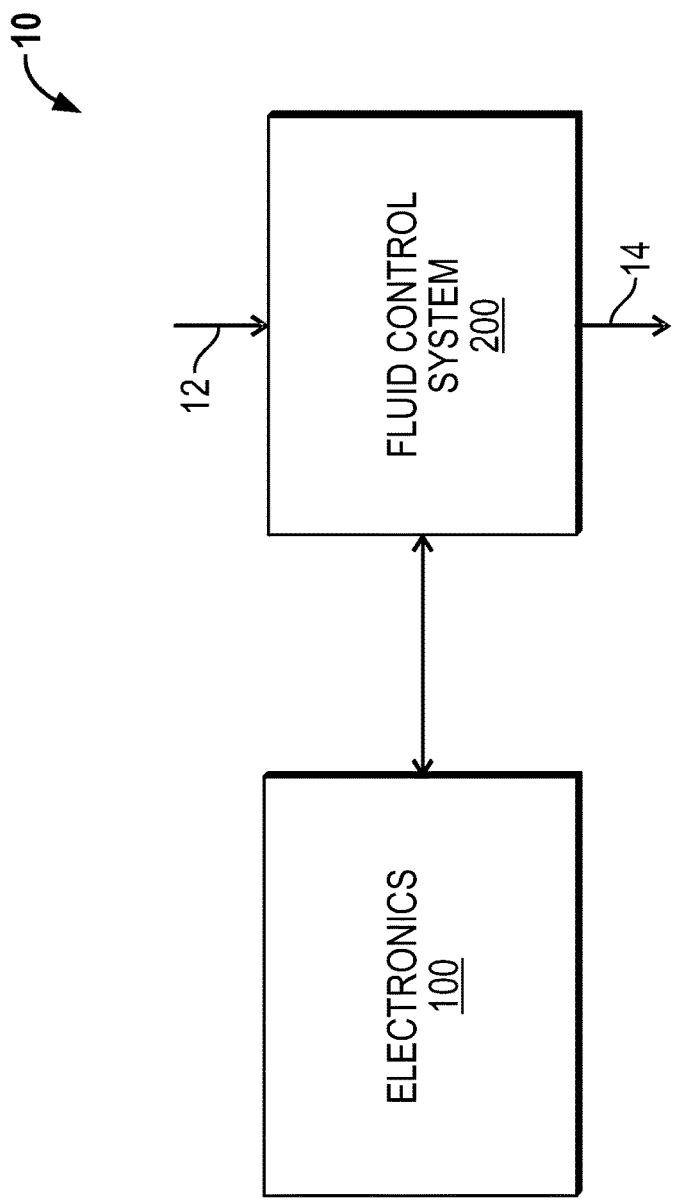
FIG. 1 shows a system 10 for active cancellation of a pulsating flow with a source noise reference according to an embodiment.

FIG. 1 shows a system 10 for active cancellation of a pulsating flow with a source noise reference according to an embodiment. As shown in FIG. 1, the system 10 includes an electronics 100 communicatively coupled to a fluid control system 200. The system 10 also includes a fluid supply 12, which is fluidly coupled to the fluid control system 200. The fluid supply 12 may be fluidly coupled to the fluid control system 200 via a conduit, pipeline, or the like. The fluid may be any fluid, such as, for example, compressible or incompressible fluids, fluids with mixed phases, emulsions, suspensions, etc. The fluid control system 200 may control the fluid supplied by the fluid supply 12 to provide a fluid flow 14, which is illustrated by an arrow.

The electronics 100 may receive a noise source signal from, for example, the pump in the fluid control system 200. In an alternative embodiment, the electronics 100 may receive a noise source signal from a noise source that is not part of the fluid control system 200. The electronics 100 can provide a valve signal to a flow controller in the fluid control system 200. The valve signal may be based on a flow rate control signal and a cancelling signal determined by the electronics 100. The flow rate control signal may be a signal that controls the flow rate of the fluid in fluid control system 200 and the cancelling signal may be a signal that attenuates one or more pulses in the fluid flow 14. The electronics 100 may determine the flow rate control signal and the cancelling signal by employing a source noise reference obtained from the noise source. Accordingly, the electronics 100 may attenuate the one or more pulses in the fluid flow 14 with the source noise reference, as will be explained in more detail in the following with reference to FIGS. 2-5.

Figure 2:
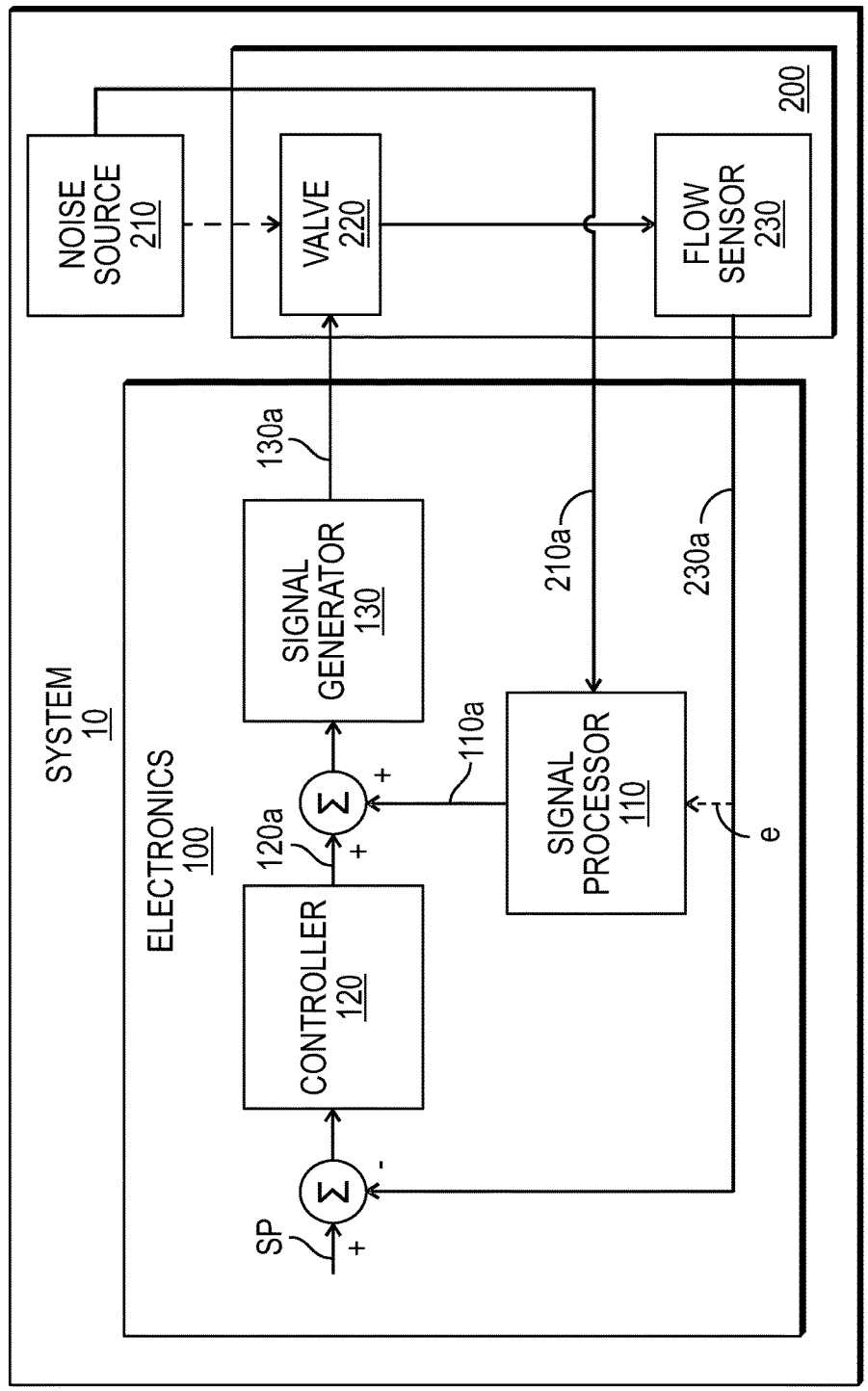
FIG. 2 shows a more detailed view of the system 10 for active cancellation of the pulsating flow with the source noise reference.

FIG. 2 shows a more detailed view of the system 10 for active cancellation of the pulsating flow with the source noise reference. As shown in FIG. 2, the system 10 includes the electronics 100 and the fluid control system 200 described in the foregoing. For clarity, the system 10 is not shown with the fluid supply 12 and the fluid flow 14. In the embodiment shown, the electronics 100 includes a signal processor 110 communicatively coupled with a controller 120. The signal processor 110 and the controller 120 are also communicatively coupled to a signal generator 130.

The fluid control system 200 and a noise source are communicatively coupled to the signal processor 110 and the signal generator 130. More specifically, with reference to the embodiment shown, the signal processor 110 is configured to receive signals from a noise source 210 and flow sensor 230 and the signal generator 130 is configured to provide a signal to the valve 220. In the embodiment shown, the noise source 210 may be a pump that is part of the fluid control system 200. However, in alternative embodiments, the noise source 210 may not be part of the fluid control system 200 and, therefore, the noise source 210 is depicted as outside of the fluid control system 200.

The valve 220 and flow sensor 230 are fluidly coupled with each other. In an embodiment where the noise source 210 is a pump or other component in the fluid control system 200, the dashed arrow between noise source 210 and the valve 220 may illustrate fluid flow. In an embodiment where the noise source 210 is not part of the fluid control system 200, the dashed arrow may illustrate noise coupled to the fluid in the fluid control system 200. Accordingly, the fluid flow and/or noise through the fluid control system 200 are illustrated by the arrows between the noise source 210, valve 220, and flow sensor 230.

As shown, the signal processor 110 receives a noise source signal 210a from a noise source 210 and a feedback error e from a flow signal 230a. The signal processor 110 employs the noise source signal 210a and the feedback error e to provide a cancelling signal 110a. The flow signal 230a is also received by the controller 120 from the flow sensor 230. In the embodiment shown, the flow signal 230a is subtracted from a set point SP. The difference is provided to the controller 120. The controller 120 employs the difference to generate and provide a flow rate control signal 120a. The cancelling signal 110a and the flow rate control signal 120a are summed and provided to the signal generator 130. The signal generator 130 employs the summation of the cancelling signal 110a and the flow rate control signal 120a to provide a valve signal 130a to the valve 220.

The electronics 100 can include any appropriate processing system configured to process the noise source signal 210a and the flow signal 230a to generate the valve signal 130a. For example, the electronics 100 may employ a processor, such as a digital signal processor ("DSP"), configured to filter, delay, split, combine, amplify, attenuate, or the like, the noise source signal 210a. In the embodiment shown, the electronics 100 may be configured to adjust a phase and magnitude of the noise source signal 210a to generate the cancelling signal 110a. The electronics 100 may also include other electronics such as, for example, a microprocessor that can receive the set point SP, subtract the flow signal 230a from the set point SP, and output a control variable, such as the flow rate control signal 120a shown in FIG. 2. The electronics 100 may also be configured to generate the valve signal 130a from the cancelling signal 110a and the flow rate control signal 120a.

Signal Processor 110

The signal processor 110 may include an analog-to-digital ("ADC"), a DSP, and any other appropriate electronics configured to receive and convert the noise source signal 210a into the cancelling signal 110a. For example, the noise source signal 210a may be an analog signal comprised of a voltage that increases or decreases in proportion to the noise provided by the noise source 210. In embodiments where the cancelling signal 110a is a digital signal, the signal processor 110 may include conditioning electronics that scales, filters, or the like, the noise source signal 210a for the ADC. The ADC samples the conditioned noise source signal 210a to provide a sequence of digital representations of the samples to, for example, the DSP. Using the DSP, the signal processor 110 may filter the sequence of the digital representations to provide the cancelling signal 110a.

The cancelling signal 110a is a signal that corresponds to the noise in the noise source signal 210a. As described in the foregoing, the noise in the noise source signal 210a may be due to the noise provided by the noise source 210, which causes the pulses of the pulsating flow of the fluid in the fluid control system 200. In the embodiment shown, the cancelling signal 110a is generated by sampling and digitizing the noise source signal 210a and adjusting the digitized noise source signal 210a using the feedback error e. The cancelling signal 110a is provided to the signal generator 130 via the summation between the controller 120 and the signal generator 130.

Controller 120

The controller 120 employs the set point SP and the flow signal 230a to generate the flow rate control signal 120a. For example, in the embodiment shown, the controller 120 may be a proportional-integral-differential ("PID") controller, although alternative controllers may be employed in other embodiments. In the embodiment shown, the controller 120 compares the set point SP with the flow signal 230a to determine a difference between the set point SP and the flow signal 230a. The difference is typically referred to as an error between the set point SP and a measured process variable. In the embodiment shown, the measured process variable is the flow signal 230a. The error is then multiplied with PID parameters to determine a control variable. In the embodiment shown, the control variable is the flow rate control signal 120a, which is summed with the cancelling signal 110a.

Signal Generator 130

The signal generator 130 receives and converts the cancelling signal 110a and flow rate control signal 120a into the valve signal 130a. The valve signal 130a controls the flow rate and cancels the pulses of the fluid flowing through the fluid control system 200. For example, the valve signal 130a may include a current with a magnitude proportional to the desired flow rate of the fluid flowing through the fluid control system 200. The valve signal 130a may also include a component that causes the valve member in the valve 220 to, for example, periodically displace a portion of the fluid in the fluid control system 200 such that the pulses in the pulsating flow are attenuated, thereby providing active cancellation of the pulsating flow provided by the noise source 210.

Fluid Control System 200

The noise source 210 may be a reciprocating pump with a motor that converts a current into a mechanical motion of a mechanical means to control a flow rate of a fluid flow. For example, the noise source 210 may have a piston, rotating arm, or the like, that pushes fluid from a fluid supply through the fluid control system 200. In alternative embodiments, the noise source 210 may be an equipment or component that vibrates due to mechanical means or other objects in nearby machinery, a moving vehicle, or the like. The noise provided by the noise source 210 may be coupled to the fluid in the fluid control system 200 due to mechanical couplings, linkages, or the like. The noise source signal 210a may be based on the noise provided by the noise source 210.

Accordingly, the noise source signal 210a is a signal associated with the pulses produced by the noise source 210. For example, in the embodiment where the mechanical means in the pump moves with the reciprocal motion, the magnitude of the current provided to the pump is correlated with the pulses. In other embodiments, the noise source signal 210a may be from an accelerometer that is coupled to a vibrating pump or conduit in the fluid control system 200 or in the nearby machinery. The accelerometer may alternatively be coupled to the other components such as, for example, a suspension system, body, frame, or the like, of the moving vehicle. Other sensors, such as, for example, displacement or velocity sensors, may also be employed to measure the vibration from the noise source 210. Accordingly, the noise source signal 210a provided by the noise source 210 may include noise that corresponds to the pulses in the pulsating flow.

The valve 220 may be a proportional valve that controls a fluid flow rate relative to a magnitude of the current in the valve signal 130a, although any suitable valve can be employed in alternative embodiments. In the embodiment shown, the valve 220 includes a valve member displaced in proportion to a current of the solenoid in the valve 220. For example, the valve member may have a profile that enlarges or decreases an opening in the valve 220 when the valve member is displaced by the current. Accordingly, the fluid flow, for example, may be linearly proportional to the current provided to the valve 220. The valve member in the valve 220 may also rapidly oscillate or displace in response to the valve signal 130a provided to the valve 220. For example, the valve member may have a small mass relative to the magnitude of the current provided to the valve 220. The pulses in the pulsating flow provided to the flow sensor 230 may therefore be attenuated.

In the embodiment shown, the flow sensor 230 is comprised of a mass flow meter that employs a sensor that can measure the flow rate. For example, the flow sensor 230 may employ a thermal dispersion sensor that transfers heat from a heated surface to the fluid. The heated surface may be a wire filament, film heater element, or the like. These are sometimes known as hot-wire or hot-film mass air flow ("MAF") sensors. The heat transfer does not occur to the bulk of the fluid flow, but in a thermal boundary layer around the heated surface. Accordingly, the sensors may be referred to as mass flux sensors. Other sensing technologies may be employed in alternative embodiments.

As discussed in the foregoing, the one or more pulses in the pulsating flow may be caused by the noise source 210, which provides the noise source signal 210a. As explained in more detail in the following, the noise source signal 210a may be employed to generate a noise reference that can be employed to attenuate the pulses in the pulsating fluid flow.

Detailed View of the System 10

Figure 3:
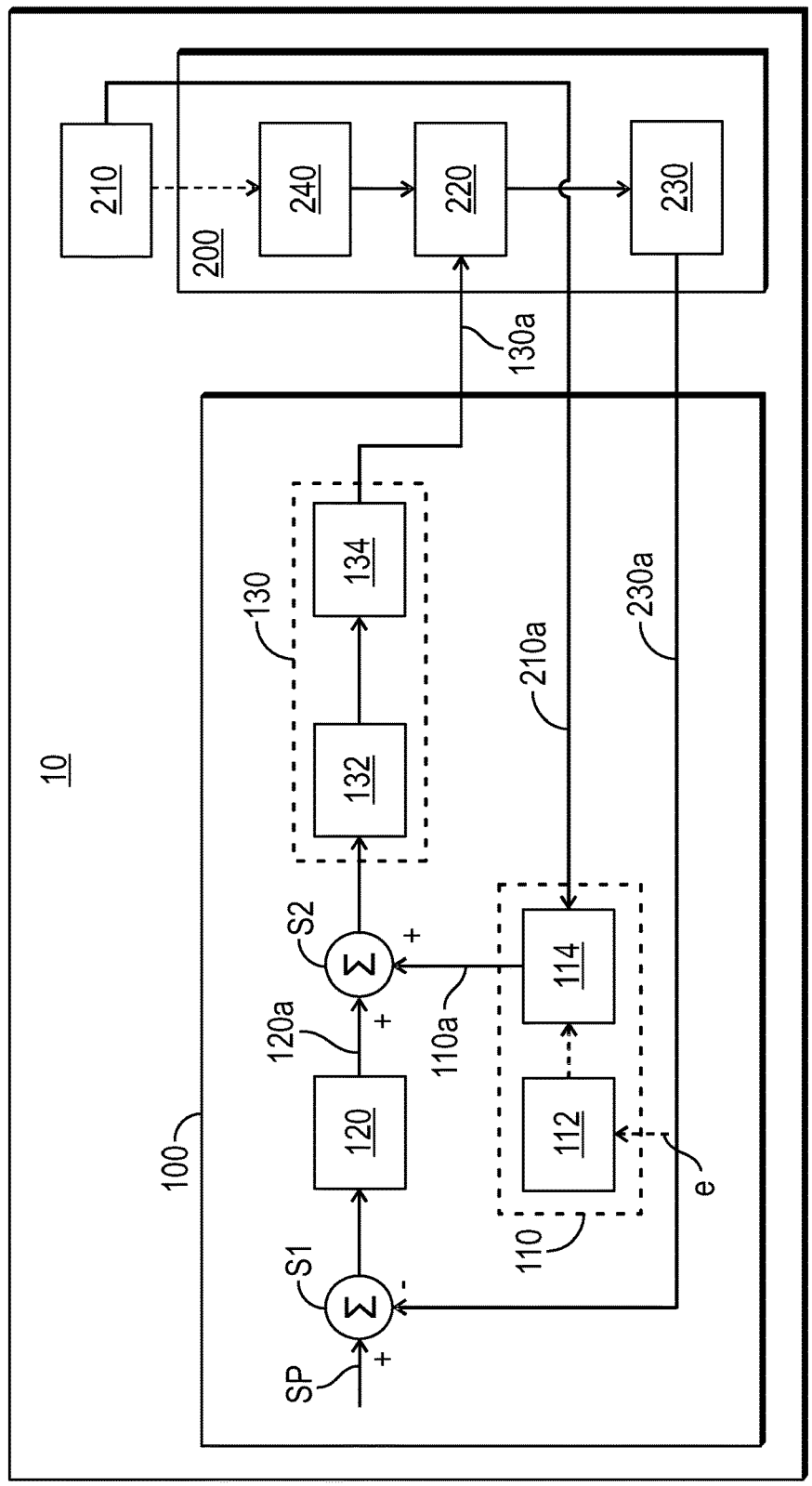
FIG. 3 shows a view with additional details of the system 10 for active cancellation of the pulsating flow with the source noise reference.

FIG. 3 shows a view with additional details of the system 10 for active cancellation of the pulsating flow with the source noise reference. As shown in FIG. 3, the system 10 includes the electronics 100 and fluid control system 200 described in the foregoing with reference to FIGS. 1 and 2. The signal processor 110, controller 120, and signal generator 130 as well as the set point SP, cancelling signal 110a, flow rate control signal 120a, and valve signal 130a are also shown. In the more detailed view, the signal generator 130 includes a pulse width modulation ("PWM") generator 132 and a valve drive 134 that are communicatively coupled. The valve signal 130a is provided by the valve drive 134. In addition, the signal processor 110 includes an adaptive algorithm 112 that is communicatively coupled to and provides coefficients for a filter 114. The filter 114 is communicatively coupled to the signal generator 130. In addition to the noise source 210, valve 220, and flow sensor 230 shown in FIG. 2, the fluid control system 200 includes a pressure regulator 240.

The pressure regulator 240 may be a pressure regulator that controls the pressure to prevent the compressed air from deviating from a desired pressure level, but may not attenuate the pulses in the pulsating flow. In alternative embodiments, other configurations may be employed, such as those that do not include the pressure regulator 240. Additionally or alternatively, the pulses may also be caused by something other than the noise source 210.

Filters

The adaptive algorithm 112 in the signal processor 110 may receive a feedback error e from the flow signal 230a. As described in the foregoing, the flow signal 230a is obtained from the flow sensor 230 and may therefore have noise associated with the pulses in the pulsating flow. The feedback error e may be employed to generate coefficients for the filter 114. For example, the adaptive algorithm 112 may be a least mean square ("LMS") algorithm for a finite impulse response ("FIR") filter in the filter 114. The LMS algorithm receives the feedback error e and, using the feedback error e, iteratively determines coefficients to minimize the noise in the flow signal 230a.

The filter 114 employs the coefficients generated by the adaptive algorithm 112 to control the amplitude and the phase of the noise source signal 210a to minimize the noise in the flow signal 230a. For example, with reference to the embodiment shown, the adaptive algorithm 112 is configured to receive the feedback error e from the flow signal 230a. Using the feedback error e, the adaptive algorithm 112 iteratively determines and provides the coefficients to the filter 114.

The filter 114 operates on the noise source signal 210a to generate the cancelling signal 110a from the noise source signal 210a. The cancelling signal 110a is summed with the flow rate control signal 120a by the second summation S2. The second summation S2 is employed to generate the valve signal 130a, which is provided to the valve 220 to both control the flow rate and attenuate the one or more pulses in the pulsating flow.

Since the cancelling signal 110a is generated while the adaptive algorithm 112 is iteratively determining and providing the coefficients to the filter 114 to minimize the noise in the flow signal 230a, the one or more pulses in the pulsating flow are attenuated by the valve signal 130a. Accordingly, the electronics 100 actively cancels the pulsating flow in the fluid control system 200, as will be discussed in more detail in the following with reference to FIG. 4.

Method for Active Cancellation of a Pulsating Flow

Figure 4:
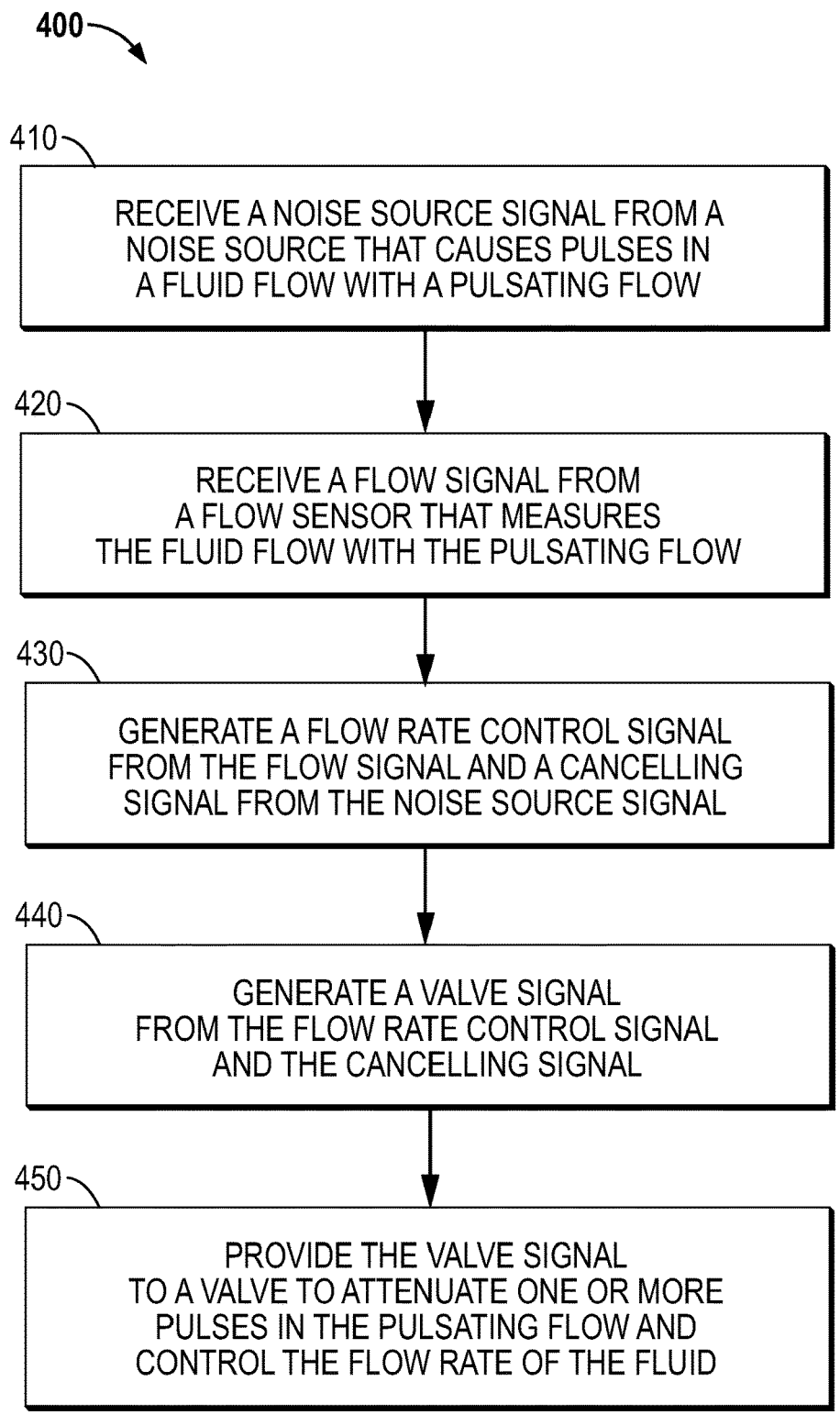
FIG. 4 shows a method 400 for active cancellation of a pulsating flow with a source noise reference according to an embodiment.

FIG. 4 shows a method 400 for active cancellation of a pulsating flow with a source noise reference according to an embodiment. The method 400 may be performed by the electronics 100 described in the foregoing, although any suitable electronics may be employed in alternative embodiments. The method 400 begins with step 410 by receiving a noise source signal from a noise source that causes pulses in a fluid flow with a pulsating flow. The noise source employed by the method 400 may be the noise source 210 described in the foregoing with reference to FIGS. 2 and 3. In step 420, the method 400 may receive a flow signal from a flow sensor that measures the fluid flow with the pulsating flow. In step 430, the method 400 generates a flow rate control signal from the flow signal and a cancelling signal from the noise source signal. The method 400 generates the valve signal from the flow rate control signal and the cancelling signal in step 440. In step 450, the method 400 provides the valve signal to a valve to attenuate one or more pulses in the pulsating flow and control the flow rate of the fluid.

The flow signal received in step 410 may be an analog signal with a voltage proportional to the flow rate of the fluid with the pulsating flow, although any suitable signal may be employed in alternative embodiments. Accordingly, when executed by electronics that include digital signal processing, the steps 410, 420 of receiving the noise source signal and the flow signal may include conditioning, sampling, and quantizing the noise source signal and the flow signal, although receiving the noise source signal and the flow signal may include any appropriate signal processing in alternative embodiments. Due to being performed with digital signal processing, the steps 410 and 420 may provide digital representations of the noise source signal.

According to an embodiment, the method 400, in step 430, can generate the flow rate control signal from the flow signal by determining a difference between the flow signal and a set point. The difference between the set point and the flow signal can be provided to a controller, which outputs the flow rate control signal. The controller may generate the flow rate control signal to minimize the difference between the set point and the flow signal. Also in step 430, the method 400 can generate the cancelling signal from the noise source signal by varying a phase and amplitude of the noise source signal until the pulses are attenuated to a desired level. For example, the method 400 could employ the adaptive algorithm 112 and use the feedback error e to iteratively generate the coefficients for the filter 114 so the noise in the flow signal 230a is minimized.

In step 440, the valve signal may be generated, in an embodiment, from a summation of the flow rate control signal and the cancelling signal. The summation may be performed by the second summation S2 described in the foregoing with reference to FIG. 3. The summation of the flow rate control signal and the cancelling signal may therefore be a composite signal with, for example, a digital representation of a DC component, such as a first sequence digital values that represent an output from the controller 120, and a second sequence of digital values that represent an output from the signal processor 110.

The valve signal may be generated by summing the flow rate control signal with the cancelling signal while the adaptive algorithm 112 iteratively generates the coefficients and the filter 114 filters the noise source signal 210a. Accordingly, the cancelling signal 110a is continuously being adjusted to minimize the noise in the flow signal 230a. As a result, the valve signal 130a is also continuously being adjusted to attenuate the pulses in the pulsating flow, as will be described in more detail in the following by referring to exemplary flow signals.

Exemplary Signals

Figure 5:
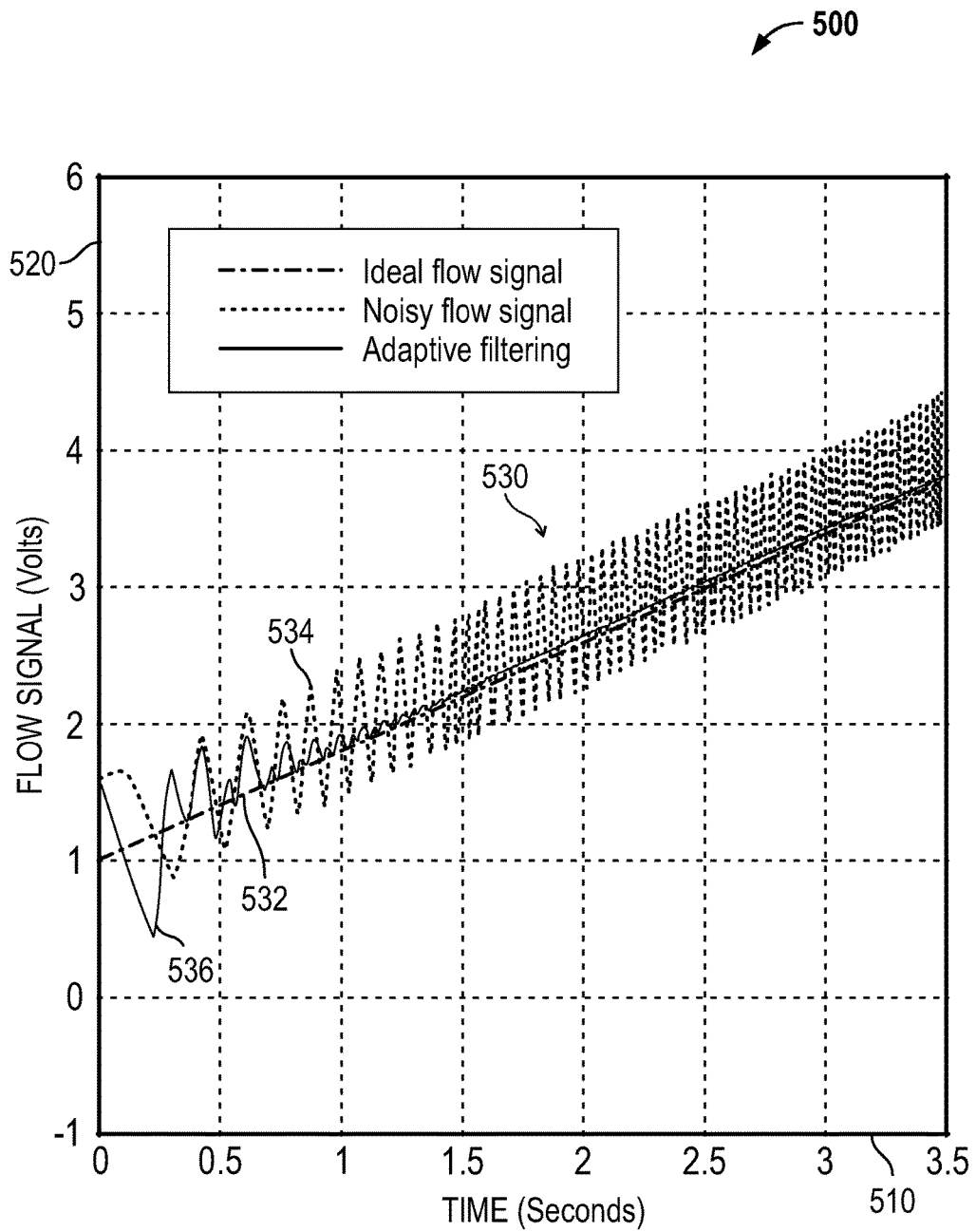
FIG. 5 shows a graph 500 with exemplary flow signals illustrating the signals received and generated by the filters.

FIG. 5 shows a graph 500 with exemplary flow signals illustrating the signals received and generated by the filters. The graph 500 includes an abscissa, which is a time axis 510, and an ordinate, which is a flow signal axis 520. The time axis 510 is in units of seconds and the flow signal axis 520 is in units of volts, although any suitable units may be employed in alternative embodiments. Also shown is a legend to assist in understanding the graph 500. The graph 500 also includes signals 530. The signals 530 is comprised of an ideal flow plot 532, against which a flow signal plot 534, and flow rate plot 536 may be compared. Alternative embodiments of the signals 530 may include more or fewer and/or different flow signals.

In the embodiment shown, the ideal flow plot 532 illustrates a desirable flow rate over time. The desirable flow rate may be the set point SP described in the foregoing. As can be appreciated from FIG. 5, the ideal flow plot 532 increases linearly over time from about 1 volt to about 3.7 volts. However, in alternative embodiments, the ideal flow plot 532 may non-linearly increase or decrease, be constant, or the like.

The flow signal plot 534 may be the flow signal 230a described in the foregoing. As can be appreciated, the flow signal plot 534 trends at a rate consistent with the ideal flow plot 532. However, the flow signal plot 534 also includes noise due to pulses in a pulsating flow. The noise in the flow signal plot 534 is illustrated as oscillations. As can be appreciated, the frequency of the oscillations is increasing over time. That is, as time increases, the time period between each cycle is decreasing. Therefore, a passive filter with a cutoff frequency greater than the lowest frequency (at 0 seconds) and less than the highest frequency of the flow signal plot 534 (at 3.5 seconds) will not filter all of the noise from the flow signal plot 534.

The flow rate plot 536 may be the flow signal 230a described in the foregoing with reference to FIGS. 3 and 4. As can be appreciated, the flow rate plot 536 includes oscillations that correspond to the oscillations in the flow signal plot 534. However, the oscillations in the flow rate plot 536 decrease with respect to time. As can also be appreciated, the oscillations in the flow rate plot 536 decrease even though the frequency of the oscillations in the flow signal plot 534 increase.

Operation of an Active Cancellation

The flow signals shown in FIG. 5, may be employed by the electronics 100 described in the foregoing with reference to FIGS. 2 and 3. For example, the signal processor 110 in the electronics 100 may receive a noise source signal 210a from the noise source 210 and the flow signal plot 534 from the flow sensor 230. The signal processor 110 can provide the flow rate plot 536 by adaptively filtering the noise source signal 210a. More specifically, the signal processor 110 may include an adaptive algorithm 112 that receives a feedback error e from the flow rate plot 536. The adaptive algorithm 112 can generate coefficients that, when provided to the filter 114, filters the noise source signal 210a to provide the cancelling signal 110a. The adaptive algorithm 112 can iteratively generate the coefficients to minimize the feedback error e. A LMS algorithm may perform the minimization, although any suitable algorithm can be employed in alternative embodiments.

Referring to the embodiment shown in FIG. 3, the cancelling signal 110a is summed with the flow rate control signal 120a. Accordingly, the valve signal 130a provided to the valve 220 may include the signal shown in the flow rate plot 536. Accordingly, the valve 220 cancels the pulses in the pulsating flow. Therefore, the flow sensor 230 measures the flow rate of the pulsating flow and does not measure the cancelled pulses. Due to the iteration in generating the coefficients, the cancelling signal 110a is adjusted by the filter 114 such that the pulses in the pulsating flow are attenuated over time. For example, referring to the flow rate plot 536 shown in FIG. 5, the magnitude of the oscillations in the flow rate plot 536 decrease as the elapsed time increases.

The embodiments described above provides a system 10 for active cancellation of a pulsating flow with a noise source signal 210a. The noise source signal 210a may be obtained from the noise source 210, which is causing the pulses in the pulsating flow. Because the signal is obtained from the noise source 210, the noise reference may be an accurate representation of the pulses in the pulsating flow. Accordingly, a signal processor 110 with a filter 114 can filter the noise source signal 210a to provide a cancelling signal 110a, which can be summed with a flow rate control signal 120a. Accordingly, a valve signal 130a generated from the flow rate control signal 120a may attenuate the pulses in the pulsating when provided to, for example, a valve 220.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other active cancellations of a pulsating flow with a source noise reference. Accordingly, the scope of the embodiments described above should be determined from the following claims.

I claim:

1. An electronics for active cancellation of a pulsating flow with a source noise reference, the electronics comprising:
    a signal processor configured to:
        receive a noise source signal from a noise source that causes one or more pulses of the pulsating flow and a flow signal from a flow sensor configured to measure a flow rate of the pulsating flow; and
        generate a cancelling signal based on the noise source signal and the flow signal;
    a controller communicatively coupled to the signal processor, the controller being configured to generate a flow rate control signal for controlling the flow rate of the pulsating flow; and
    a signal generator communicatively coupled to the signal processor and the controller, the signal generator being configured to:
        receive the flow rate control signal;
        generate a valve signal based on the flow rate control signal and the cancelling signal; and
        provide the valve signal to a valve to control the flow rate and attenuate the one or more pulses of the pulsating flow.

2. The electronics of claim 1, wherein the signal processor is further configured to receive a feedback error from the flow signal and provide the cancelling signal based on the feedback error.

3. The electronics of claim 1, wherein the signal processor is configured to adjust a phase and an amplitude of the noise source signal to provide the cancelling signal.

4. The electronics of claim 1, wherein the signal processor is configured to generate and provide coefficients to a filter that receives the noise source signal and provides the cancelling signal.

5. The electronics of claim 4, wherein the signal processor is further configured to provide coefficients to the filter to minimize the feedback error.

6. The electronics of claim 1, wherein the signal generator is comprised of a pulse width modulator and a valve drive.

7. A method for active cancellation of a pulsating flow with a source noise reference, the method comprising:
receiving a noise source signal from a noise source that causes one or more pulses of the pulsating flow;
receiving a flow signal from a flow sensor that measures a flow rate of the pulsating flow;
generating a flow rate control signal from the flow signal and a cancelling signal from the noise source signal;
generating a valve signal from the flow rate control signal and the cancelling signal; and
providing the valve signal to a valve to control the flow rate and attenuate the one or more pulses of the pulsating flow.

8. The method of claim 7, further comprising receiving a feedback error from the flow signal and providing the cancelling signal based on the feedback error.

9. The method of claim 7, wherein generating the cancelling signal from the noise source signal comprises adjusting a phase and an amplitude of the noise source signal.

10. The method of claim 7, further comprising generating and providing coefficients to a filter that receives the noise source signal and provides the cancelling signal.

11. The method of claim 7, wherein generating the valve signal comprises generating a pulse width modulated signal and using the pulse width modulated signal to generate the valve signal.

12. A system for active cancellation of a pulsating flow with a source noise reference, the system comprising:
a fluid control system comprising:
a valve; and
a flow sensor fluidly coupled to the valve; and
an electronics communicatively coupled to a noise source, the valve, and the flow sensor, the electronics configured to:
receive a noise source signal from the noise source and a flow signal from the flow sensor;
generate a flow rate control signal from the flow signal and a cancelling signal from the noise source signal;
generate a valve signal based on the flow rate control signal and the cancelling signal; and
provide the valve signal to the valve to control the flow rate and attenuate one or more pulses of the pulsating flow.

13. The system of claim 12, wherein the electronics comprises a signal processor configured to receive the noise source signal from the noise source and the flow signal from the flow sensor and provide the cancelling signal based on the noise source signal and the flow signal.

14. The system of claim 12, wherein the electronics further comprises a controller configured to receive a difference between a set point SP and the flow signal, generate the flow rate control signal based on the difference, and provide the flow rate control signal to the signal generator.

15. The system of claim 12, wherein the signal generator is further configured to receive a summation of the cancelling signal and the flow rate control signal.

* * * * *